United States Patent [19]
Downey

[11] 3,721,491
[45] March 20, 1973

[54] SYSTEM FOR PROCESSING A STRIP OF PHOTOGRAPHIC MATERIAL

[75] Inventor: Rogers B. Downey, Lexington, Mass.

[73] Assignee: Polaroid Corporation, Cambridge, Mass.

[22] Filed: Aug. 4, 1971

[21] Appl. No.: 169,007

Related U.S. Application Data

[62] Division of Ser. No. 813,469, April 4, 1969, Pat. No. 3,608,455.

[52] U.S. Cl. .................. 352/72, 352/78, 352/130, 242/72, 242/199
[51] Int. Cl. .............................................. G03b 23/02
[58] Field of Search .......... 352/72, 78, 130, 159, 174, 352/182; 95/13; 242/198, 199, 76

[56] References Cited

UNITED STATES PATENTS

| | | | |
|---|---|---|---|
| 3,410,498 | 11/1968 | Winkler et al. | 352/78 R |
| 3,545,851 | 12/1970 | Bogdanowicz | 352/78 R |
| 3,137,427 | 6/1964 | Martin | 352/174 X |
| 3,615,127 | 10/1971 | Land | 352/78 |
| 3,582,195 | 6/1971 | Pignone | 352/78 |
| 3,284,155 | 11/1966 | Jensen et al. | 352/78 R X |
| 2,624,231 | 1/1953 | Kingston | 352/174 |
| 3,612,435 | 10/1971 | Roman | 352/158 X |
| 3,550,879 | 12/1970 | Bundshuh | 352/123 X |
| 1,946,605 | 2/1934 | Wittel | 352/78 R |
| 3,623,417 | 11/1971 | Eloranta et al. | 352/72 X |

FOREIGN PATENTS OR APPLICATIONS

337,122   5/1921   Germany ............................. 352/182

Primary Examiner—Samuel S. Matthews
Assistant Examiner—Alan A. Mathews
Attorney—Charles Mikulka et al.

[57] ABSTRACT

A motion picture system including a film handling cassette and a rear projection screen viewer. The cassette has a projection station which may include a light reflecting element and is insertable into an elongated slot in the top wall member of the viewer. Complementary features of the cassette and viewer permit the viewer to selectively restrain rotation of a film guide idler within the cassette during film projection operations.

4 Claims, 8 Drawing Figures

SYSTEM FOR PROCESSING A STRIP OF PHOTOGRAPHIC MATERIAL

This is a division of copending application Ser. No. 813,469 filed Apr. 4, 1969, now U.S. Pat. No. 3,608,455.

BACKGROUND OF THE INVENTION

1. Field of Invention

This invention relates to photography and, more particularly, to an improved system for projecting images recorded on a film strip housed in a motion picture film handling cassette.

2. Description of the Prior Art

After motion picture film has been exposed in a camera, it has generally been the practice for the photographer to mail the reel of exposed film to a processing laboratory. At the laboratory the film is removed from the reel and subjected to a series of operations in order to develop visible images from the images recorded on the exposed film. The fully developed film is then rewound onto a reel at the laboratory and returned to the user.

The extended delay normally incurred between the time exposed film is mailed to the laboratory and returned ready for viewing has proved to be a significant inconvenience to the user and a source of great annoyance.

The field of still photography is no longer hampered by extensive periods of delay associated with the processing of exposed film. The impact on the public of the one-step photographic process employing diffusion transfer techniques is a matter of record and generally well known. The home still photographer can now enjoy the fruits of his efforts in a matter of seconds. This important convenience has been available to the amateur still photographer for many years.

Most recently, important technological advances have made it possible for the home photographer interested in motion pictures to enjoy this same convenience. Radically different systems have now been developed which permit the photographer himself to quickly and easily process and project a strip of motion picture film shortly after the pictures have been taken. Exemplary of such new and unique systems are those described in copending applications, Ser. No. 755,901 of Edwin H. Land filed Aug. 28, 1968; Ser. No. 761,771 of Rogers B. Downey filed Sept. 23, 1968; Ser. No. 776,481 of Rogers B. Downey filed Nov. 18, 1968; Ser. No. 772,789 of Vaito K. Eloranta and Benjamin C. Ruggles filed Nov. 1, 1968; and Ser. No. 788,897, of Rogers B. Downey filed Jan. 3, 1969; all of which applications are assigned to the assignee of the present invention. All of the systems described in the aforementioned copending applications most advantageously employ a cassette from which the film need not be removed during exposure, processing and projection operations.

In commercial and industrial operations, such rapid motion picture processing systems are not only an improvement as a matter of convenience, but have other important effects as well. For instance, motion picture newsreel programs can be presented on television to the viewing public shortly after events of interest have occurred and been photographed.

Considerable funds and effort are currently being expended to further improve and refine various features of these systems in order to reduce their cost, to further simplify the task of the operator, to improve their reliability, and to improve the quality of the final product.

One of the objects of this invention therefore is to provide an improved system for projecting images recorded on a film strip housed within a motion picture film handling cassette.

Another primary object of this invention is to provide improved apparatus for receiving a cassette of the type indicated and effecting the projection of the film strip housed therein.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof will best be understood from the following description of the preferred embodiment when read in connection with the accompanying drawings wherein like numbers have been employed in the different figures to denote the same parts and wherein:

DESCRIPTION OF THE PREFERRED EMBODIMENT

A preferred embodiment of this invention is illustrated as applying a compatible processing fluid to a film structure which comprises both a photosensitive image-recording layer and an image-receiving layer in which a visible image may be formed by image-forming substances transferred by diffusion from the photosensitive layer without necessitating the subsequent removal of the processed photosensitive layer. This highly desirable type of film structure is made possible by a developed negative image having low covering power.

In typical silver halide diffusion transfer-reversal processes for the production of black-and-white images, a silver halide developer and a silver halide solvent are applied in an aqueous alkaline solution to a photoexposed silver halide stratum or emulsion where they develop exposed silver halide to silver and react with unreduced silver halide to form a soluble silver complex. This complex, in order to form a positive print, is transferred and reduced to silver on a silver-receptive stratum upon which the silver halide stratum has been superposed. It has generally been the practice, in the completion of this process, to separate the silver-receptive and silver halide strata in order to render the positive image visible, particularly, when it is to be viewed in transmitted light.

However, as indicated above, the positive print may be rendered visible without separation of the silver halide and silver receptive strata. For example, the silver receptive stratum may be so constituted as to provide an unusually vigorous silver precipitating environment which causes the silver deposited upon it, in comparison with silver developed in the silver halide stratum, to possess very high covering power, i.e., opacity for a given mass of reduced silver. If the silver halide is in such a concentration as to give rise only when fully developed to a predetermined low maximum density, and if the silver complex is reduced to silver in a vigorous silver precipitating environment, the resulting negative and positive images in superposition provide a composite that presents a good image for projection purposes as long as the images are carried on a light-transmitting support. Since the silver halide stratum and the silver receptive stratum need not be separated, a simplification of the overall silver halide diffusion transfer-reversal process is achieved.

A composite film assembly of this type as well as processing compositions for producing a stable black-and-white image which can be viewed by transmitting light without the necessity of removing the processed, negative image-containing photosensitive layer are shown in prior U.S. Pat. No. 2,861,885 of Edwin H. Land which issued on Nov. 25, 1958. Other composite film assemblies capable of producing photographic records which can be exhibited in full color without the necessity of removing the processed photosensitive layer are shown in prior U.S. Pats. Nos. of Edwin H. Land 2,726,154 issued Dec. 6, 1955 and 2,944,894 issued July 12, 1960. All of these prior patents are assigned to the assignee of the present invention.

However, it should be noted that the present invention is not directed to the chemistry by which visible images are formed in an exposed photosensitive material and/or formed in an image receiving stratum associated therewith. While an illustrated preferred embodiment of the invention is shown applying a compatible processing fluid to a film structure not requiring the removal of the photosensitive layer after visible image formation is completed, the invention itself is also applicable for use with other types of processing fluids and film structures.

Figure 1:
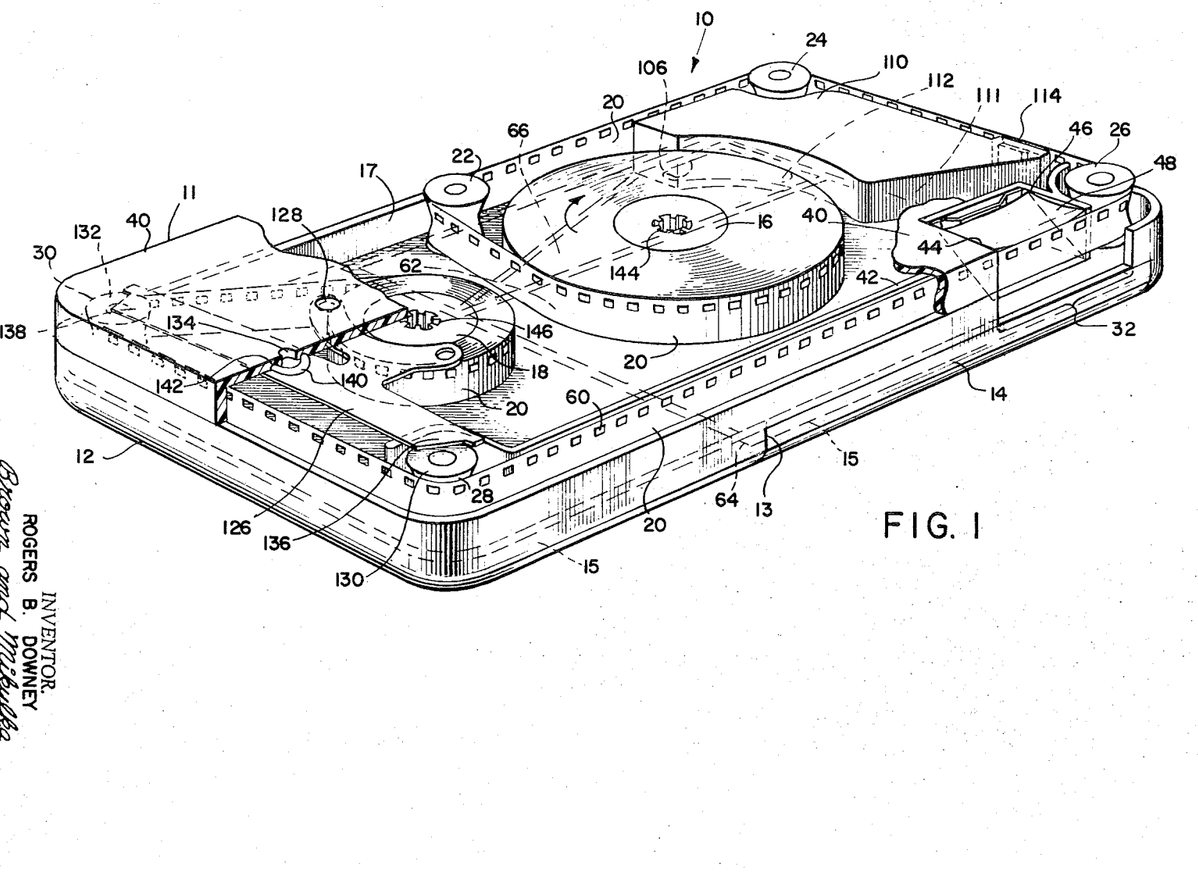
FIG. 1 is a diagrammatic cutaway perspective view of a compact multipurpose motion picture film handling cassette embodying features of this invention.

The illustrated preferred embodiment of this invention may best be understood by first referring to FIG. 1 of the drawings. As may be seen therein a compact multi-purpose film handling cassette 10 is basically constituted by a pair of frame members 11 and 12 connected together to form an enclosed opaque housing. The frame member 12 is provided with a recessed portion 13 and a removable cover plate 14 which in combination define an enclosed section 15 separated from a light-tight section 17 of the cassette 10.

Cutout portions of the frame members 11 and 12 define a film gate 32 through which image carrying light rays may enter and/or leave the cassette 10. In this embodiment, the cassette is relatively flat and generally rectangular parallelepiped in configuration. A supply reel 16 and a takeup reel 18 are coplanarly mounted within section 17 of the cassette 10 for rotation about parallel axes. A strip of unexposed photographic material 20, of the type previously discussed and provided with leaders affixed to the supply reel 16 and the takeup reel 18 is initially substantially entirely coiled around the supply reel. In traveling from the supply reel 16 to the takeup reel 18, the strip of photographic material 20 sequentially passes around idlers 22, 24, 26, 28 and 30. Advantageously, the idlers 26 and 28 are positioned in opposite corners or extremities of the cassette 10 and on the same side of the supply reel 16 and the takeup reel 18. Mounted between the frame member 12 and the wall 40 of the frame member 11 is a light sealing plate 42 which extends adjacent the film strip 20 from a position in the vicinity of the idler 26 to within the vicinity of the idler 28. This light sealing plate 42 is configured to seat along the edge of an opening 44 provided in the wall 40 adjacent the film gate 32 thereby cooperating with the frame member 12 to define a recess 46 within the cassette 10 sealed in a light-tight manner from that portion of the section 17 of the cassette in which the reels 16 and 18 are contained. As will subsequently be explained in more detail, this recess 46 in conjunction with the film gate 32 is adapted to serve as both an exposure and projection station of the cassette 10 and preferably is positioned intermediate of the idlers 26 and 28 in the immediate vicinity of idler 26 adjacent the extremity of the cassette 10 which that idler occupies.

Mounted by any suitable means within the recess 46 is a light reflecting element 48. In the system illustrated in the drawings, this light reflecting element 48 is prismatic in nature, as may be seen in FIG. 2, and includes a concave light receiving transparent face 50 and a flat reflecting surface 52 which reflects light received into the element through the concave face 50 outwardly through a convex transparent face 54 onto that portion of the film strip 20 disposed across the film gate 32. This light reflecting element 48 also includes a pair of parallel bearing surfaces 56 and 58 disposed on the opposite sides of its convex transparent face 54 and on which the film trip 20 is supported as it traverses the film gate 32. A prismatic element of this type suitable for use in connection with the present invention is described in copending application, Ser. No. 767,609 of Herbert A. Bing filed Oct. 18, 1968 and assigned to the assignee of the present invention. As may be seen in both FIGS. 1 and 2 of the drawings, the film strip 20 includes sprocket holes 60 as is conventional.

Returning momentarily to FIG. 1 of the drawings, an assembly 62 may be seen comprising a relatively flat rectangularly shaped collapsible pod or container 64 and a relatively flat generally triangularly shaped fluid feeding device 66. This assembly is attached by any suitable means to the frame member 12 within the cassette's enclosed section 15. As shown in detail in FIG. 3 of the drawings, the collapsible container or pod 64 comprises two opposed walls 68 and 70 bonded together in the vicinity of their peripheral edge surfaces to form a cavity 72 containing processing fluid 74 suitable for producing visible images on the film strip 20 after it has been exposed to image carrying light rays. The walls 68 and 70 may be formed of any suitable material which is flexible and deformable so as to transmit a hydraulic pressure to the processing fluid 74 within the cavity 72 responsive to an externally mounted force applying member being pressed against one of their exterior surfaces. It is desirable that these walls 68 and 70 be substantially impervious to the processing fluid 74 and inert to attack by that fluid. Typically they may consist of an outer layer 76 of pouch or glassine paper, an intermediate layer 78 of lead foil and an inner liner 80 of polyvinylchloride material. Under proper pressure and temperature conditions, the polyvinylchloride liners 80 may be bonded together to effect the sealing of the fluid filled cavity 72. It is important that a seal 82 along the marginal section 84 of the collapsible container 64 be substantially weaker than the seals along the other marginal sections thereof. As shown in the drawings, the walls 68 and 70 extend only a short distance beyond the seal 82.

Figures 3, 6:
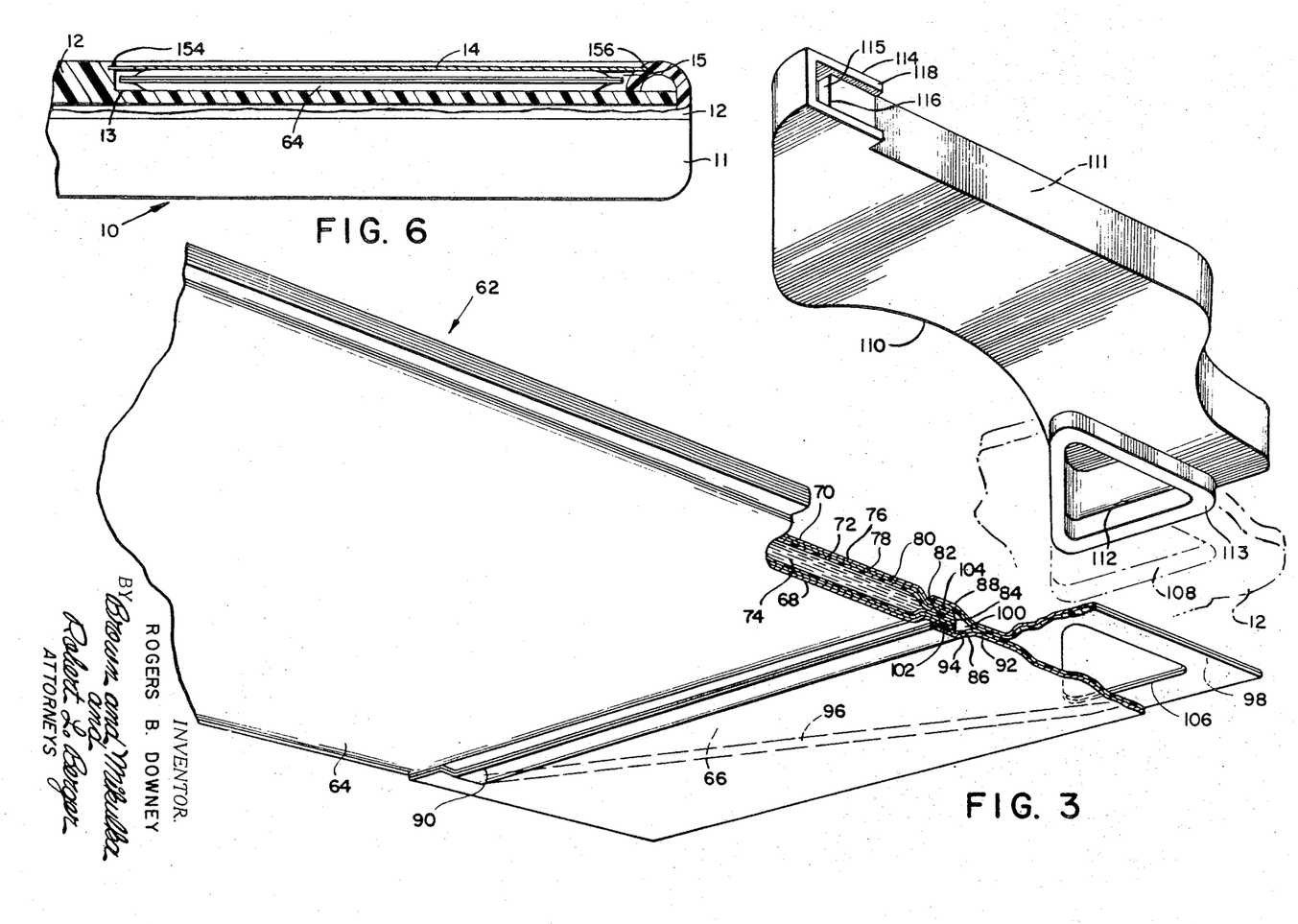
FIG. 3 is a partially cut away perspective view, partially in section and partially exploded, illustrating various details of the processing fluid storage and applicator system employed in the cassette of FIG. 1.
FIG. 6 is a partial sectional view illustrating the nature of the removable cover plate of the cassette illustrated in FIG. 1.

As indicated, in its preferred form the collapsible pod or container 64 is rectangular in form and the seal 82 is formed along one of its sides.

The fluid feeding device 66 also comprises two opposed walls 86 and 88. This device 66 includes one side 90 substantially equivalent in length to the marginal section 84 of the collapsible pod 64. It is desirable that the walls 86 and 88 are formed of a material which is both impervious and inert with respect to the processing fluid 74. For example, they may be formed of an outer layer 92 of pouch or glassine paper bonded to an inner layer 94 of polyethylene material. A seal is formed between these walls 86 and 88 along a line 96 and adjacent their marginal surface 98. Additionally, the fluid feeding device 66 is provided with an entrance port 100 by forming a seal 102 between the inner layer 94 of the wall 86 and the outer layer 76 of the wall 68 and a seal 104 between the inner layer 94 of the wall 88 and the outer layer 76 of the wall 70. Provided in the wall 88 is an exit orifice 106 which is adjacent the seal along its marginal surface 98. It will thus be appreciated that once the seal 82 of the pod 64 has been ruptured, the device 66 provides a chamber configured to direct fluid 74 from the container 64 through its exit orifice 106. These portions of the opposed walls 86 and 88 positioned on the other side of the line 96 from the entrance port 100 serve no useful purpose and may be disposed of if desired. However, since they may readily be accommodated in the housing of the cassette 10, a trimming operation may be eliminated by not removing these portions of the walls.

When positioned in the cassette 10, the exit orifice 106 is located in alignment with an aperture 108 provided through the frame member 12. Positioned within the section 17 of the cassette 10 is a dispensing container 110 which includes a reservoir chamber 111 at least equal in capacity to the cavity 72 of the collapsible container 64. For instance, it has been found that approximately 2 cc. of processing fluid is sufficient to treat 50 feet of Super 8 format film. Under such conditions the cavity 72 would have a capacity of 2 cc. and the capacity of the dispensing container's reservoir chamber 111 should be on the order of 2 to 2½ cc. This reservoir chamber 111 is in communication with the fluid feeding device 66 by means of an opening 112 provided with the dispensing container 110. In this respect, the dispensing container 110 is provided with a projection 113 adjacent the opening 112 which extends through the aperture 108 in the frame member 12 and which is bonded to the outside surface of the fluid feeding device's wall 88 adjacent the periphery of its exit orifice 106.

Figures 2, 4, 5:
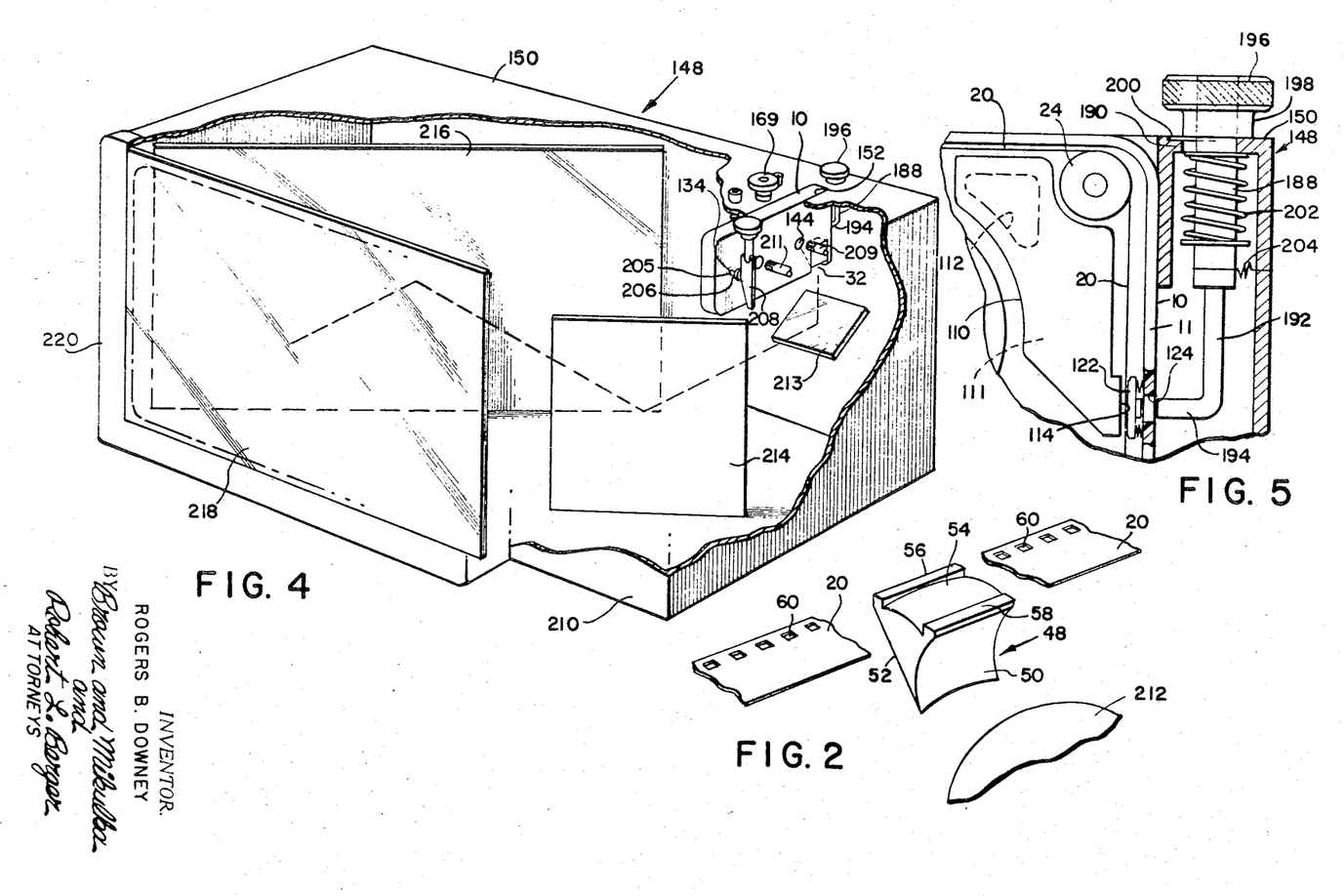
FIG. 2 is a diagrammatic perspective view partially cut away, illustrating the light reflecting element and film strip employed in the cassette shown in FIG. 1 and also illustrating the operative relationship between the light reflecting element and the light source of a projector.
FIG. 4 is a diagrammatic cut away perspective view of the processor-projector unit adapted to receive the film handling cassette shown in FIG. 1 and embodying features of this invention.
FIG. 5 is a partial vertical sectional view illustrating the cooperating elements of the cassette and the processor-projector unit for selectively seating the film strip against the applicator.

The dispensing container 110 also includes an applicator 114 which is in communication with the reservoir chamber 111 through an orifice 115. This applicator 114 includes a doctor blade 116 and a U-shaped extension 118 which, as will later become apparent, serves to position the film strip 20 a carefully predetermined distance away from the doctor blade. It will be noted that the dispensing container 110 is mounted within the section 17 of the cassette 10 so that its applicator 114 is disposed adjacent a section of the film strip 20 intermediate of the idlers 24 and 26. As shown in FIG. 5, a support plate 122 is spring mounted from the frame member 11 on the opposite side of the film strip 20 from, and in alignment with, the applicator 114. An aperture 124 provided in the frame member 11 adjacent the support plate 122 permits an externally mounted member to be introduced into the cassette 10 to displace the support plate 122 into contact with the film strip 20 and to seat the film strip against the applicator 114 whereby the film strip is slidably engaged between the support plate and the applicator. It will be recognized that, once the processing fluid has been expelled from the collapsible container 64 into the reservoir chamber 111 of the dispensing container 110 and the film strip 20 has been seated against the applicator 114, transport of the film strip in a direction from the takeup reel 18 to the supply reel 16 will cause the film strip to draw processing fluid 74 from the applicator to form a fluid coating therealong.

Returning once again to FIG. 1 of the drawings, it will be seen that a resilient member 126 is connected to the inside face of the wall 40 by any suitable means, such as rivets 128, and extends over and in spaced relationship to the end surfaces 130 and 132 of the idlers 28 and 30, respectively. Provided in the wall 40 is an aperture 134 disposed over the resilient member 126 whereby an externally mounted force applying member may be introduced into the cassette 10 to urge end portions 136 and 138 of that member 126 into frictional engagement with the idlers 28 and 30, respectively, so as to restrain further rotational movement of those idlers. In order to effectively light seal the interior of the cassette 10, a ring 140 mounted on the resilient member 126 is coaxially disposed with respect to the aperture 134 and adapted to seat in an annular recess 142 of the wall 40.

The reels 16 and 18 are respectively provided with fluted recesses 144 and 146 which are adapted to receive externally mounted drive means through apertures (not shown) appropriately provided through the wall 40. Thus the cassette 10 includes means for reversibly transporting the film strip 20 between the supply reel 16 and the takeup reel 18 and across the applicator 114 and the film gate 32. Consequently, the film gate 32 is adapted to serve as an exposure station during a first pass of the photosensitive film strip 20 thereacross and as a projection station during subsequent operations in which the film strip, in a fully processed condition, is advanced from the supply reel 16 to the takeup reel 18.

Idler 26, around which the film strip 20 passes on its way from the supply reel 16 to the film gate 32 may, if desired, be mounted on a movable post spring biased towards the corner which it occupies in the housing of the cassette 10 and capable of being move resiliently inward away from that corner. Also, idler 28 may be spring biased towards the corner which it occupies of the housing of the cassette 10 and capable of being moved resiliently inward away from that corner. This represents one way to minimize strain exerted on the film strip 20 by the conventional intermittent film advancement structure engaging the sprocket holes 60 of the film during these exposure and projection operations.

As indicated, the cassette 10 is initially furnished with substantially all of the film strip 20 in an unexposed condition coiled on the supply reel 16. For exposure purposes, the cassette 10 is mounted in an appropriate camera (not shown) with the drive means of the camera engaging the recess 146 of the takeup reel 18. While the particular camera employed does not form part of the present invention, it may advantageously take the form of the camera described in the present inventor's copending application, Ser. No. 813,427 filed Apr. 4, 1969. It will be noted that the camera described in that application includes a door mounted pin which automatically enters the cassette 10 through its aperture 134 to snub the idlers 28 and 30 whenever the cassette is mounted therein. In any case, in this use light rays from the scene being photographed are focused by the camera lens through the camera shutter and the film gate 32 onto the photosensitive film strip 20 in its passage from the supply reel 16 to the takeup reel 18. During this exposure sequence, the processing fluid 74 is retained within the collapsible container 64 and the film strip 20 passes between and in spaced relationship to the support plate 122 and the applicator 114, thereby rendering the applicator inoperative. As the film strip 20 is drawn onto the takeup reel 18 by power supplied thereto by the camera, it is simultaneously advanced past the film gate 32 in incremental steps by a typical claw mechanism or the like of the camera cooperating with the sprocket holes 60 provided in the film strip 20. In this respect, if desirable, the cassette 10 may include still an additional aperture and conventional means (not shown) for receiving the camera's claw mechanism and cooperating therewith so that the claw mechanism, at the proper time, advances the film strip 20 across the film gate 32 in incremental steps. In traversing the film gate 32 the film strip 20 is supported on the bearing surfaces 56 and 58 of the light reflecting element 48. In the embodiment illustrated, the photosensitive surface of the film strip 20 faces inwardly of the cassette 10 such that exposure of the photosensitive emulsion is effected through the transparent film base.

While the exposed film strip 20 may be processed with the cassette 10 mounted in a camera or when it is mounted in a special processing apparatus, it is preferably processed while the cassette is mounted in a special processor-projector unit 148 diagrammatically illustrated in FIG. 4 of the drawings. In this connection, the top panel 150 of the processor-projector unit 148 is provided with a slot 152 configured to receive the cassette 10. Prior to inserting the cassette 10 into the processor-projector unit 148, its plate 14 should be removed to expose the rupturable processing fluid containing pod 64 and fluid feeding device 66. In this connection, it will be seen from FIG. 6 of the drawings that the removable plate 14 seats in grooves 154 and 156 provided in the cassette's frame member 12. This removable plate member 14 serves to protect the collapsible container 64 and fluid feeding device prior to the processing operation and is preferably made of a material such as a thin sheet of aluminum, steel or plastic so as to be readily slidably removed from the grooves 154 and 156 and reinserted thereinto.

Figures 7, 8:
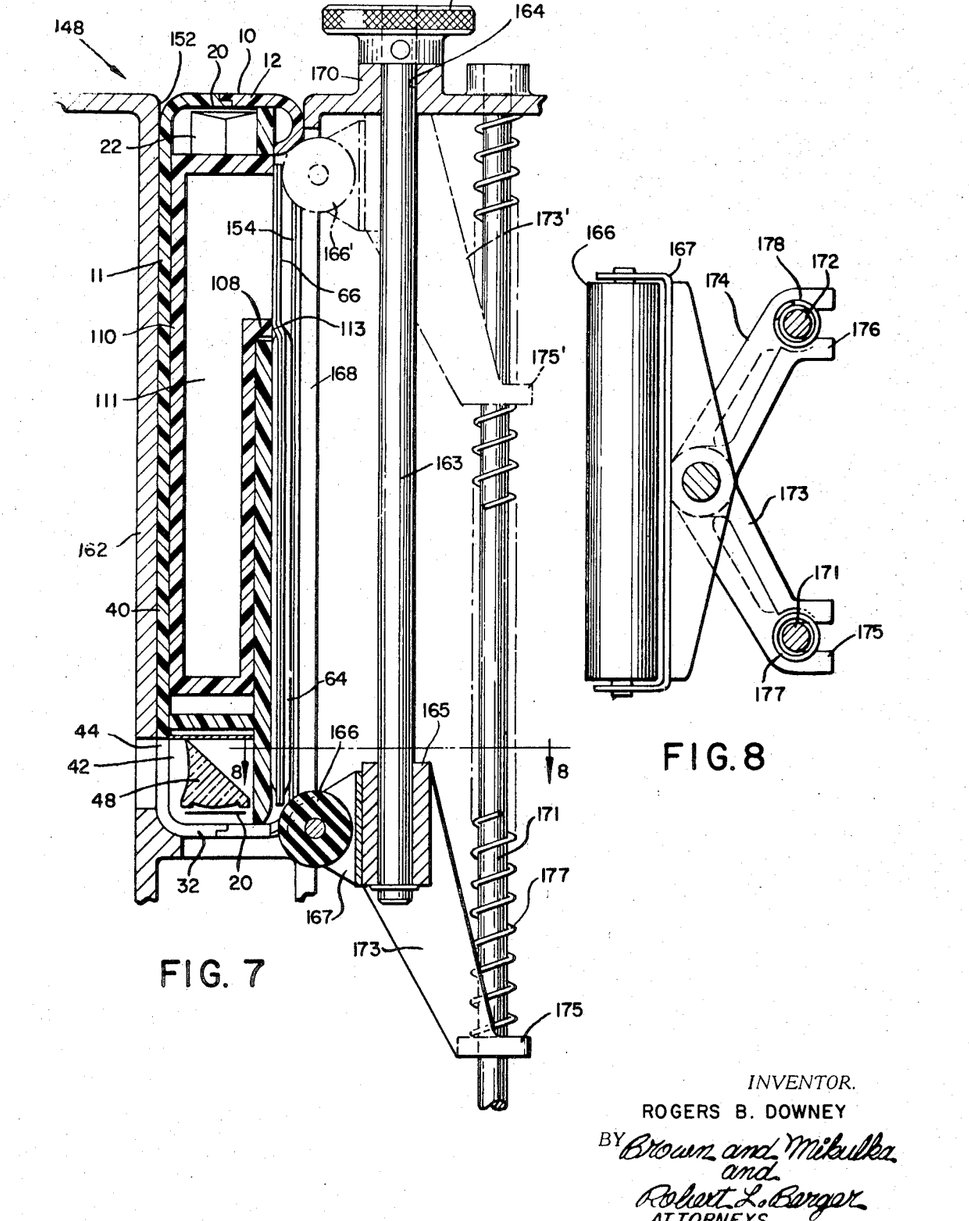
FIG. 7 is a partial vertical sectional view illustrating the force applying means of the processor-projector unit shown in FIG. 4 and the manner in which those means cooperate with the rupturable container of the cassette shown in FIG. 1.
FIG. 8 is a view illustrating the force applying means of the processor-projector unit shown in FIG. 4 taken along with the line 8—8 of FIG. 7.

A preferred embodiment of the force applying means of the processor-projector unit 148 is diagrammatically illustrated in FIGS. 7 and 8 of the drawings. As shown therein, the cassette 10 is positioned within the processor-projector unit 148 by a mounting bracket 162. A pin 163 is slidably disposed through a circular aperture 164 passing through the top panel 150 of the unit 148. Affixed to the end of the pin 163 positioned internally of the processor-projector unit 148 is a support member 165. A roller 166 is rotatably mounted in a bracket 167 connected to the support member 165. It will be noted that this roller is initially positioned through an opening 168 in the mounting bracket 162 to be disposed in the plane of the fluid filled collapsible container 64 and the fluid feeding device 66 and below the collapsible container. In this respect, a hand knob 169 is provided on the end of the pin 163 extending externally of the processor-projector unit 148 and seats against an extension 170 of the top panel 150 to limit the downward movement of the pin and roller 166 attached thereto within the processor-projector unit 148.

A pair of guide rods 171 and 172 extend in parallel vertical relationship through the processor-projector unit 148. Formed as an integral part of the support member 165 are a pair of outwardly extending arms 173 and 174, the respective ends of which terminate in yokes 175 and 176 engaging guide rods 171 and 172, respectively. Springs 177 and 178, respectively mounted on the guide rods 171 and 172, act against the yokes 175 and 176 to continually urge the pin 163 and the roller 166 attached thereto towards their lowermost positions as viewed in FIG. 7 of the drawings. It will thus be appreciated that the hand knob 169 can be displaced upwardly against the force of the springs 177 and 178 as viewed in FIG. 7 to move the roller from its lowermost position to its position as shown in phantom in that Figure. Such a displacement of the hand knob 169 causes the roller to progressively apply a compressive force across the collapsible container 64 and the fluid feeding device 66 whereby the collapsible container's weakened seal 82 is ruptured and the processing fluid 74 initially retained therein expelled into the reservoir chamber 111 of the dispensing container 110. The force of the springs 177 and 178 will automatically return the roller 166 to its original position when the operator releases the hand knob 169. The roller 166, of at least its peripheral surface, is preferably formed of a resiliently compressible material such as rubber.

As shown in FIG. 5 of the drawings, a pin 188 extends through a slot 190 also provided in the top panel 150 of the unit 148 and its lower portion 192 terminates in a projection 194 aligned with the aperture 124 of the cassette 10 once the cassette 10 has been fully inserted into the processor-projector unit 148. Mounted on the end of the pin 188 extending exteriorly of the unit 148 is a hand knob 196 (see also FIG. 4) provided with a reduced stem portion 198 adapted to seat in a recess 200 communicating with the slot 190. A spring 202 continually urges the pin 188-hand knob 196 assembly inwardly of the processor-projector unit 148, while a spring 204 continually urges that assembly along the slot 190 in a right hand direction as viewed in FIG. 5. Consequently, after the cassette 10 has been inserted into the processor-projector unit 148, the operator may displace the hand knob 196 along the slot 190 to bring the support plate 122 into contact with the film strip 20 and to slidably engage the film strip against the applicator 114. At that time, reduced stem portion 198 of the hand knob 196 seats in the recess 200 to lock the support plate 122 against the film strip 20. In this respect, the aperture 124 is slightly larger than the projection 194 to allow for a little downward displacement of the projection as the reduced stem portion 198 seats in the recess 200.

A pin 205 (see FIG. 4) of the processor-projector unit 148 is positioned to be in alignment with the cassette's aperture 134 once the cassette has been fully inserted into the processor-projector unit. A spring 206 mounted on the pin 205 continually urges that pin in a direction away from the cassette 10. However, a tapered arm 208 slidably mounted within the processor-projector unit 148 and extending through that unit's top panel 150 contacts the pin 205 to restrain its movement away from the cassette 10. In this manner, the operator may manipulate the arm 208 to selectively drive the pin 205 internally of the cassette 10 against the resilient member 126 to effect a snubbing of the idlers 28 and 30.

After the cassette 10 has been fully inserted into the unit 148, drive shafts 209 and 211 of that unit engage the fluted recesses 144 and 146 of the supply reel 16 and the takeup reel 18, respectively. These shafts 209 and 211 are connected in a conventional manner to a motor (not shown) in order to facilitate selective reversible transport of the film strip 20 between the cassette's film strip advancing means, i.e., between the supply reel 16 and the takeup reel 18, and across the cassette's opening or film gate 32. As is conventional, the drive shaft 211 which engages the takeup reel 18 is connected to the motor through a friction clutching arrangement. Appropriate switches (not shown) for selectively energizing the cassette's supply reel 16 and the takeup reel 18 are conveniently located on a control panel 210 of the processor-projector unit 148.

The processor-projector unit 148 also includes other conventional elements, e.g., an intermittent film advancement mechanism, a light source, a shutter mechanism, and a lens system. The light source 212 of the processor-projector unit 148 is diagrammatically illustrated in FIG. 2 and is positioned such that its light rays are directed through the concave light receiving transparent face 50 of the light reflecting element 48 when the cassette 10 is mounted in the processor-projector unit. Operation of this light source 212 is controlled by a button (not shown) positioned on the control panel 210. Once the film strip 20 has been processed, light rays from the light source 212 can be redirected by the cassette's light reflecting element 48 outwardly of the cassette through the film strip 20 and the film gate 32. These now image carrying light rays are then further redirected by a plurality of mirrors 213, 214, and 216 and focused by the projector lens system onto a viewing screen 218 mounted in the front panel 220 of the processor-projector 148.

OPERATION OF THE PREFERRED EMBODIMENT

To briefly summarize the operation of the preferred embodiment of this invention, the cassette 10 with its film strip 20 in an unexposed condition and substantially entirely coiled on the supply reel 16 and with its processing fluid 74 retained within the cavity 72 of the collapsible container 64, is adapted to be quick mounted in a camera (not shown). The camera includes a friction clutched drive shaft which engages the recess 146 of the takeup reel 18 and which can be selectively energized by the camera's motor to advance the film strip 20 from the supply reel 16 onto the takeup reel 18. During this process, the claw mechanism of the camera engages the sprocket holes 60 of the film strip 20 to draw the film strip in incremental steps across the film gate 32 for exposure purposes. In this manner, the operator can selectively record images on the photosensitive film strip 20 as it traverses the film gate 32. After the film strip 20 has been completely exposed, the cassette 10 can be quickly removed from the camera and replaced, when desired, by an identical cassette containing unexposed film.

Prior to inserting the cassette 10 into the processor-projector unit 148 its plate 14 should be removed, the hand knob 196 displaced to its furthermost right hand direction along the slot 190 as viewed in FIG. 5 and the tapered arm 208 displaced to its uppermost positioned as viewed in FIG. 4. After the hand knob 196 has been displaced along the slot 190 to slidably engage the film strip 20 against the applicator 114, the operator should pull the hand knob 180 outwardly of the unit 148 to rupture the collapsible container 64 and to expell the processing fluid 74 therefrom into the reservoir chamber 111 of the dispensing container 110. Additionally, after the cassette 10 has been inserted into the unit 148, the fluted recesses 144 and 146 of the cassette's supply and takeup reels 16 and 18, respectively, are engaged by the aforementioned drive shafts 209 and 211 of that unit.

By then turning an appropriate switch located on the control panel 210 of the processor-projector unit 148, the exposed strip of material 20 is returned from the takeup reel 18 to the supply reel 16. During this sequence, the exposed photographic film strip 20 passes across the face of the applicator 114 and draws processing fluid 74 from the applicator to form a uniform fluid coating along its entire length. In this respect, it will be noted that with cassette 10 inserted into the unit 148, the applicator 114 is disposed at the lowermost point of the dispensing container 110 and the force of gravity causes processing fluid 74 to be continually fed to the applicator from the reservoir chamber 111.

The motor of the processor-projector unit 148 is automatically de-energized by conventional means (not shown) as soon as the entire length of exposed film strip 20 has been drawn across the applicator 114 onto the supply reel 16. At this time the support plate 122 should be returned to its original position to permit the film strip 20 to return to a position where it is disposed out of contact with the applicator 114. This is accomplished by withdrawing the hand knob 196 from the recess 200 and allowing the force of the spring 204 to return the pin 188 to its original position along the slot 190. Additionally, the operator should displace the tapered arm 208 inwardly of the processor-projector unit 148 to effect a snubbing of the idlers 28 and 30.

By then turning a second switch (not shown) mounted on the control panel 210, the light source 212 of the processor-projector unit 148 and that unit's motor are simultaneously energized, in this instance the motor driving both the intermittent film advancement mechanism of the unit 148 and the takeup reel 18 of the cassette 10. As the now fully processed film strip 20 is once again drawn across the film gate 32 onto the takeup reel 18, visible images contained thereon are projected onto the screen 218 for viewing purposes. Again, conventional means (not shown) automatically de-energize the light source 212 and the motor of the unit 148 once the entire processed film strip 20 has been projected.

Preferably, the film strip 20 is returned from the takeup reel 18 to the supply reel 16 before removing the cassette 10 from the processor-projector unit 148. Once the cassette 10 has been removed from that unit 148, its plate 14 should be replaced. In this condition, the cassette 10 may be conveniently stored until it is again desired to view the developed film strip 20 contained therein. Later insertions of the cassette 10 containing the developed film strip 20 into the processor-projector unit 148 to facilitate subsequent viewings are preferably effected with the cassette's removable plate 14 in place.

Editing of the developed film strip 20 can easily be effected. It is only necessary to draw a loop of the film strip 20 from the film gate 32 and to remove sections therefrom or to splice sections thereinto as desired.

The term "projector" is used herein in a comprehensive sense, i.e., to broadly refer to those systems wherein the visible images recorded on a sheet of material are re-imaged for viewing purposes and is not restricted to only those systems in which the recorded visible images are projected onto a screen of one type or another.

This invention may be practiced or embodied in still other ways without departing from the spirit or essential character thereof. The preferred embodiment described herein is therefore illustrative and not restrictive, the scope of the invention being indicated by the appended claims and all variations which come within the meaning of the claims are intended to be embraced therein.

What is claimed is:

1. Apparatus for use with a motion picture film handling cassette from which the film is not removed during projection operations, such cassette including a substantially flat housing of a given thickness, a projection station, a strip of photographic material, means adapted to be driven by externally mounted drive means to facilitate the progressive advancement of such strip of material from its initial position within such cassette past such projection station in operative relationship thereto, at least one idler around which such strip of photographic material is disposed after passing such projection station and means for selectively restraining the rotation of such idler responsive to such rotation restraining means being engaged by an externally mounted member, said apparatus comprising:

a housing including a top wall member and a front wall member comprising a rear projection screen;

means for receiving at least a major portion of such cassette into said apparatus housing including an elongated slot in said top wall member configured to have such cassette inserted thereinto, said slot being only slightly greater in width than the thickness of such cassette housing;

film image projection means located to be disposed in operative relationship with such projection station when such cassette has been inserted into said apparatus;

means for selectively driving such advancing means of such cassette; and a member mounted to be selectively engaged with such rotation restraining means of such cassette to preclude rotation of such idler during projection operations.

2. A photographic system comprising:

a motion picture film handling cassette including:
a housing;
a projection station;
a strip of photographic material;
means adapted to be driven by externally mounted drive means to facilitate the progressive advancement of said strip of material from its initial position within said cassette past said projection station in operative relationship thereto;
at least one idler around which said strip of photographic material is disposed after passing said projection station; and
means for selectively restraining the rotation of said idler responsive to said rotation restraining means being engaged by an externally mounted member; and an apparatus comprising:
a section adapted to receive said cassette;
film image projection means located to be disposed in operative relationship with said projection station when said cassette has been positioned in said apparatus; and
a member adapted to selectively engage said rotation restraining means of said cassette to preclude rotation of said idler during projection operations.

3. Apparatus for use with a motion picture film handling cassette from which the film is not removed during projection operations, such cassette including a projection station, a strip of photographic material stored therein, means adapted to be driven by externally mounted drive means to facilitate the progressive advancement of such strip of material from its initial position within such cassette past such projection station in operative relationship thereto, at least one idler around which such strip of photographic material is disposed after passing such projection station, means for selectively restraining the rotation of such idler responsive to such rotation restraining means being engaged by an externally mounted member, said apparatus comprising:

a section adapted to receive such cassette;

film image projection means located to be disposed in operative relationship with such projection station when such cassette is positioned in said section;

means for selectively driving such advancing means of such cassette; and a member adapted to selectively engage such rotation restraining means of such cassette to preclude rotation of such idler during projection operations.

4. The invention of claim 3 wherein said member is displaceably mounted for movement between a first position wherein it is disposed out of engagement with such rotation restraining means and a second position wherein it is disposed in engagement with such rotation restraining means to restrain further rotation of such idler and including means for selectively displacing said member between its said first and second positions.

* * * * *